UNITED STATES PATENT OFFICE.

HERMANN W. WILKE, OF LONG ISLAND CITY, NEW YORK.

STEERING VESSELS.

No. 873,818.  Specification of Letters Patent.  Patented Dec. 17, 1907.

Application filed July 18, 1907. Serial No. 384,332.

*To all whom it may concern:*

Be it known that I, HERMANN W. WILKE, a subject of the German Emperor, and a resident of Long Island City, county of Queens, State of New York, have invented certain new and useful Improvements in Steering Vessels, of which the following is a specification.

The present invention pertains to the art of steering vessels and has for its object to provide means whereby in emergency cases on open sea, or in ports the vessel can be steered around much more rapidly than with the hitherto used rudder, and thereby accidents easily avoided, and time saved in docking the vessel.

Figure 1:
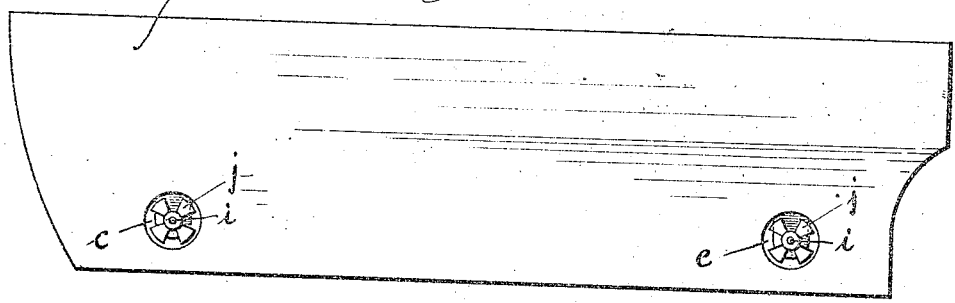
Figure 2:
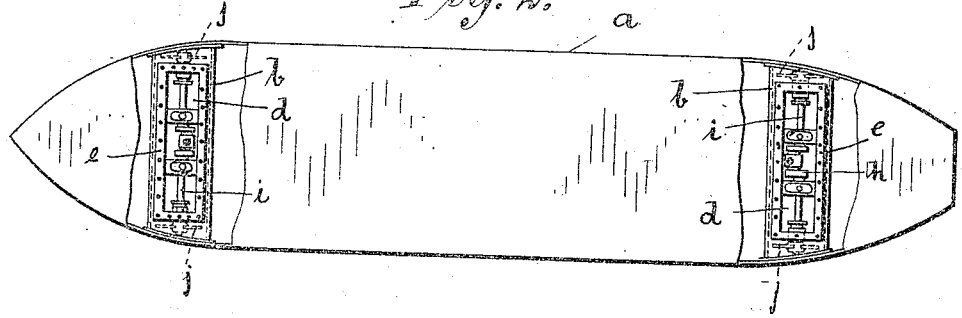
Figure 3:
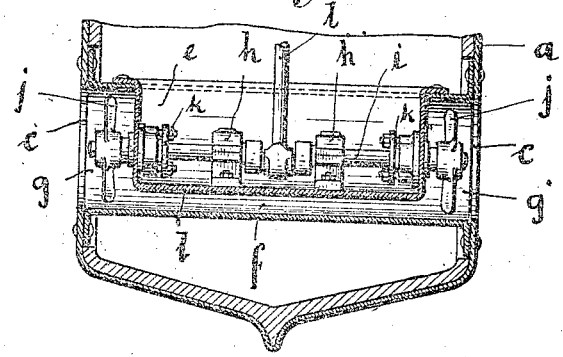

To make my invention more clear the same is illustrated in the accompanying drawing in which similar reference letters denote corresponding parts and in which Figure 1 is an elevation Fig. 2 a plan view of the vessel and Fig. 3 is an enlarged vertical cross section thereof.

My invention consists in that at the aft and fore of the vessel $a$ a transversely extending water pipe $b$ is provided that at its ends is riveted or otherwise tightly secured to the side walls of the vessel in which circular openings $c$ are provided. In the upper surface of said pipe a rectangular aperture $d$ is cut out around the edges of which a casing $e$ of sheet metal is secured. The latter extends downward into the pipe and has a circular cross section. Between the circumference of the said casing $e$ and that of the pipe $c$ a channel $f$ and at each side of the casing at the end of the pipe $c$ a cylindrical chamber $g$ are formed. Extending longitudinally through the casing $e$ and supported in bearings $h$ is a crank shaft $i$ the ends of which pass through the side walls of the casing $e$ into the chambers $g, g$ and carry propellers $j$. $k, k$ denote stuffing boxes for the ends of the shaft. The crank shaft at each end of the vessel is adapted to be operated by a connecting rod $l$ from the driving power of the vessel.

In order to rapidly steer the vessel the respective couple of propellers are set in operation whereby water will be drawn in at one side of the vessel and caused to pass through channel $f$ to be thrown out in a jet at the other side. According to which couple of propellers is operated the vessel will be steered from right to left or vice versa.

What I claim and desire to secure by Letters Patent is:

1. The combination with a vessel, of transversely extending pipes at the fore and aft ends and secured to the side walls of the vessel and terminating in openings therein, the said pipes being cut out at the upper surface, cylindrical casings secured to said pipes and projecting downward through the cut out portion of the latter, crank shafts extending longitudinally through and supported in said casings, propellers arranged at each end of the said shafts, said propellers being adapted to draw in water at one side of the vessel and to throw the same out in a jet on the other side thereof, to steer the vessel, and means for operating said propeller shafts, substantially as and for the purpose specified.

2. The combination with a vessel, of transversely extending pipes at the fore and aft ends and secured to the side walls of the vessel and terminating in openings thereof, the upper surface of the said pipes being cut out, casings secured to the pipes and projecting downward through the cut out portion thereof, said casings forming between their circumference and that of the pipes a water channel and at both sides propeller chambers, crank shafts extending longitudinally through and supported in said casings, propellers at the outwardly projecting ends of said shafts, and means for operating the shafts, substantially as and for the purpose specified.

Signed at New York this 17 day of July 1907.

HERMANN W. WILKE.

Witnesses:
JOSEPH E. CAVANAUGH,
MAX D. ORDMANN.